United States Patent
Chick et al.

(10) Patent No.: US 11,938,738 B2
(45) Date of Patent: Mar. 26, 2024

(54) SYRINGE BODIES

(71) Applicant: HEWLETT-PACKARD DEVELOPMENT COMPANY, L.P., Spring, TX (US)

(72) Inventors: Andrew P. Chick, Vancouver, WA (US); Kenneth K. Smith, Boise, ID (US); Jiwon Moon, Pangyo (KR); Minul Lee, Pangyo (KR); Matthew James Storey, Austin, TX (US); An Tran, Austin, TX (US); Bennett Alexander Nadeau, Austin, TX (US); Zackary Thomas Hickman, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 637 days.

(21) Appl. No.: 17/050,676

(22) PCT Filed: Aug. 30, 2018

(86) PCT No.: PCT/US2018/048775
§ 371 (c)(1),
(2) Date: Oct. 26, 2020

(87) PCT Pub. No.: WO2020/046323
PCT Pub. Date: Mar. 5, 2020

(65) Prior Publication Data
US 2021/0229451 A1    Jul. 29, 2021

(51) Int. Cl.
*B41J 2/175*    (2006.01)
*B29C 64/343*    (2017.01)
(Continued)

(52) U.S. Cl.
CPC ......... *B41J 2/17526* (2013.01); *B29C 64/343* (2017.08); *B29C 64/393* (2017.08);
(Continued)

(58) Field of Classification Search
CPC .............. B65D 83/0022; B41J 2/17503; B41J 2/17506; B41J 2/17566
See application file for complete search history.

(56) References Cited

U.S. PATENT DOCUMENTS

| | | | | |
|---|---|---|---|---|
| 5,749,853 | A | * | 5/1998 | O'Donnell ...... A61M 25/10184 604/97.03 |
| 6,511,142 | B1 | * | 1/2003 | Carmon ............... B41J 2/17513 347/7 |

(Continued)

FOREIGN PATENT DOCUMENTS

| CN | 1682055 | 10/2005 |
|---|---|---|
| CN | 106264796 | 1/2017 |

(Continued)

OTHER PUBLICATIONS

Dymax, "Low-Level Sensing Systems User Guide", 2014, pp. 1-32.
GPD Global, "Level Detect User Guide", Feb. 21, 2018, pp. 1-11.

*Primary Examiner* — Shelby L Fidler
(74) *Attorney, Agent, or Firm* — Foley & Lardner LLP

(57) ABSTRACT

In some examples, an apparatus can include a syringe body including an electrical interface at a side surface of the syringe body, an interface at an end of the syringe body including an output at a distal surface of the syringe body, a print material particles reservoir located in the syringe body, and a structure to adapt a volume of the print material particles reservoir to move print material particles out of the print material particles reservoir through the output, where (Continued)

in response to the volume adapting structure moving from a first position to a second position, a signal is transmitted by the electrical interface.

14 Claims, 8 Drawing Sheets

(51) Int. Cl.
B29C 64/393 (2017.01)
B33Y 30/00 (2015.01)
B33Y 50/02 (2015.01)
B65D 83/00 (2006.01)

(52) U.S. Cl.
CPC ............... *B33Y 30/00* (2014.12); *B33Y 50/02* (2014.12); *B41J 2/17503* (2013.01); *B41J 2/17506* (2013.01); *B65D 83/0022* (2013.01)

(56) References Cited

U.S. PATENT DOCUMENTS

| | | |
|---|---|---|
| 9,662,839 B2 | 5/2017 | Napadensky |
| 11,294,301 B2 * | 4/2022 | Ahn .................... G03G 15/0867 |
| 2005/0004518 A1 * | 1/2005 | Call ................ A61M 25/10184 |
| | | 604/97.02 |
| 2007/0052740 A1 | 3/2007 | Guhse et al. |
| 2009/0099350 A1 | 4/2009 | Yamashita et al. |
| 2015/0290949 A1 * | 10/2015 | Gomi ................. A61B 17/3203 |
| | | 347/85 |
| 2016/0213834 A1 | 7/2016 | Brady et al. |
| 2017/0050383 A1 | 2/2017 | Bell et al. |

FOREIGN PATENT DOCUMENTS

| | | | |
|---|---|---|---|
| EP | 1032496 A1 | 9/2000 | |
| JP | 6098468 | 6/1985 | |
| JP | 2010-241036 | 10/2010 | |
| JP | 2011-25487 | 2/2011 | |
| KR | 20000040191 | 7/2000 | |
| KR | 20120140594 A | * 12/2012 | .......... B41J 2/17513 |
| WO | 99/10180 A1 | 3/1999 | |
| WO | WO2017035007 A1 | 3/2017 | |

* cited by examiner

SYRINGE BODIES

CROSS REFERENCE TO RELATED APPLICATIONS

This application is a U.S. National Stage Application which claims the benefit under 35 U.S.C. § 371 of International Patent Application No. PCT/US2018/048775 filed on Aug. 30, 2018, the contents of which are incorporated herein by reference.

BACKGROUND

Imaging systems, such as printers, copiers, etc., may be used to form markings on a physical medium, such as text, images, etc. In some examples, imaging systems may form markings on the physical medium by performing a print job. A print job can include forming markings such as text and/or images by transferring print material particles to the physical medium.

DETAILED DESCRIPTION

Figure 1:
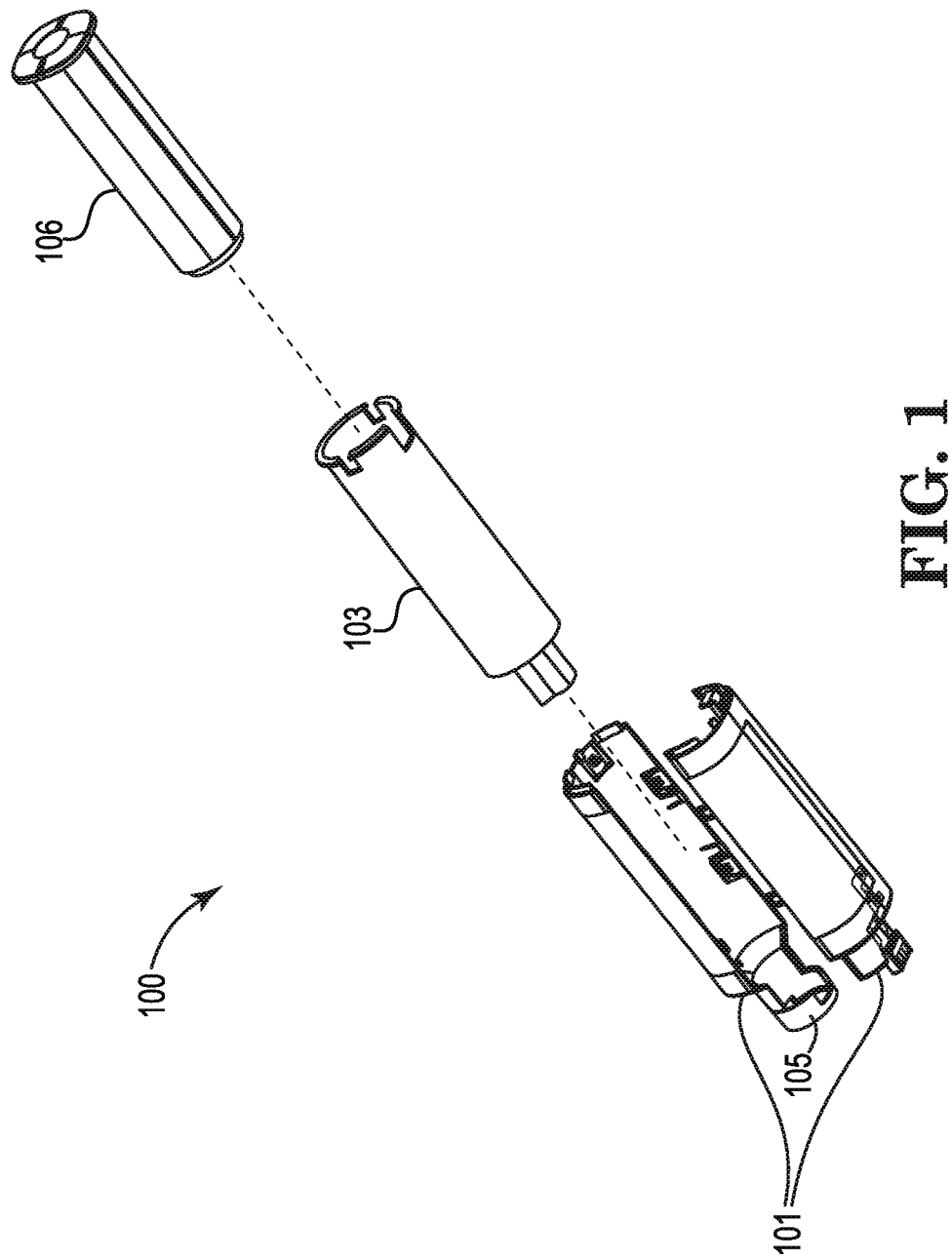
FIG. 1 illustrates an exploded view of an example of a print material particles container consistent with the disclosure.

Imaging devices may include a supply of a print material particles located in a reservoir. As used herein, the term "print material particles" refers to a substance which, when applied to a medium, can form representation(s) on the medium during a print job. In some examples, the print material particles can be deposited in successive layers to create three-dimensional (3D) objects. For example, print material particles can include a powdered semi-crystalline thermoplastic material, a powdered metal material, a powdered plastic material, a powdered composite material, a powdered ceramic material, a powdered glass material, a powdered resin material, and/or a powdered polymer material, among other types of powdered or particulate material. The print material particles can be particles with an average diameter of less than one hundred microns. For example, the print material particles can be particles with an average diameter of between 0-100 microns. However, examples of the disclosure are not so limited. For example, print material particles can be particles with an average diameter of between 20-50 microns, 5-10 microns, or any other range between 0-100 microns. The print material particles can be fused when deposited to create 3D objects.

The print material particles can be deposited onto a physical medium. As used herein, the term "imaging device" refers to any hardware device with functionalities to physically produce representation(s) on the medium. In some examples, the imaging device can be a 3D printer. For example, the 3D printer can create a representation (e.g., a 3D object) by depositing print material particles in successive layers to create the 3D object.

The reservoir including the print material particles may be inside of the imaging device and include a supply of the print material particles such that the imaging device may draw the print material particles from the reservoir as the imaging device creates the images on the print medium. As used herein, the term "reservoir" refers to a container, a tank, and/or a similar vessel to store a supply of the print material particles for use by the imaging device.

As the imaging device draws the print material particles from the reservoir, the amount of print material particles in the reservoir may deplete. As a result, the amount of print material particles in the reservoir of the imaging device may have to be replenished.

A print material particles container may be utilized to fill and/or refill the reservoir of the imaging device with print material particles. During a fill and/or refill operation, the print material particles container can transfer print material particles from the print material particles container to the reservoir of the imaging device.

Determining whether a fill/refill operation has been completed can have an effect on the performance of the imaging device. For example, determining if a fill/refill operation has been completed can provide accurate print material particle levels, reducing the risk of overfill or running out of print material particles, since overfill can jam and/or damage the imaging device as overfilling of print material particles can prevent mechanisms from functioning, and running out of print material particles can cause damage to the imaging device and/or faster wear.

Accordingly, syringe bodies can allow for a determination of completion of a fill/refill operation. For example, an outer syringe body and an inner syringe body can be differently shaped to allow for the inclusion of detection mechanisms to determine when a fill/refill operation has been completed. For instance, when a plunger of a syringe is moved from a first position to a second position a determination can be made that the fill/refill operation is completed when the syringe arrives at the second position. The imaging device can continue to perform print jobs as a result.

FIG. 1 illustrates an exploded view of an example of a print material particles container 100 consistent with the disclosure. Print material particles container 100 can include syringe body 101, inner portion 103 of syringe body 101, and plunger 106.

As illustrated in FIG. 1, print material particles container 100 can include inner portion 103 of syringe body 101. As used herein, the term "inner portion of the syringe body" refers to an inner portion of a syringe. As used herein, the term "syringe" refers to a reciprocating pump including a plunger and a tube, where the plunger can be linearly moved to allow the syringe to take in and/or expel liquid or gas through an orifice at the end of the tube.

Print material particles container 100 can include plunger 106. As used herein, the term "plunger" refers to a piston to take in and/or expel liquid or gas through an orifice at the end of inner syringe body (e.g., the inner portion 103). For example, the inner portion 103 of syringe body 101 can be a tube that can include print material particles, and plunger 106 can take in and/or expel the print material particles, as is further described in connection with FIG. 4. Plunger 106 can be a structure to adapt a volume of the inner portion 103 of syringe body 101. For example, plunger 106 can increase or decrease a volume of inner portion 103 based on movement of plunger 106 in inner portion 103.

Print material particles container 100 can include print material output 105. As used herein, the term "print material output" refers to an opening through which material can be moved. For example, print material output 105 can be an opening through which print material particles can be moved in response to plunger 106 decreasing a volume of inner portion 103 of syringe body 101 based on movement of plunger 106 in inner portion 103.

Although not illustrated in FIG. 1 for clarity and so as not to obscure examples of the disclosure, plunger 106 can be located in inner portion 103 of syringe body 101. For example, plunger 106 can be coaxially located in inner portion 103 of syringe body 101 to allow plunger 106 to take in print material particles to and/or expel print material particles from inner portion 103 of syringe body 101.

Print material particles container 100 can include syringe body 101. As used herein, the term "syringe body" refers to a structure of a syringe. Syringe body 101 can include various components of the syringe. For example, syringe body 101 can be an outer structure of print material particles container 100 and can include inner portion 103 of syringe body 101 and plunger 106. In some examples, syringe body 101 and inner portion 103 can be a single body. For example, syringe body 101 and inner portion 103 can be a single structure.

Syringe body 101 can be differently shaped than inner portion 103 of syringe body 101. For example, syringe body 101 can be a first shape, and inner portion 103 of syringe body 101 can be a second shape, where the first shape and second shape are different. For example, syringe body 101 can be in the shape of a rectangular prism with rounded edges, and inner portion 103 of syringe body 101 can be in the shape of a cylinder, although examples of the disclosure are not limited to the above described shapes.

Syringe body 101 can include a cross-sectional shape. As used herein, the term "cross-section" refers to a section of a syringe body made by a plane cutting transversely and at a right angle to the axis of the syringe body. For example, syringe body 101 can include a cross-sectional shape of a square with rounded corners, as is further described in connection with FIG. 3A.

Although syringe body 101 is described above as including a cross-sectional shape of a square with rounded corners, examples of the disclosure are not so limited. For example, syringe body 101 can include a triangular cross-sectional shape, rectangular cross-sectional shape, irregular cross-sectional shape, ergonomical cross-sectional shape, or any other cross-sectional shape.

Inner portion 103 of syringe body 101 can include a cross-sectional shape. For example, inner portion 103 of syringe body 101 can include a cross-sectional shape of a circle, as is further described in connection with FIG. 3B. The cross-sectional shape of the inner portion 103 of syringe body 101 can be different than the cross-sectional shape of the outer syringe body 101.

Figure 2:
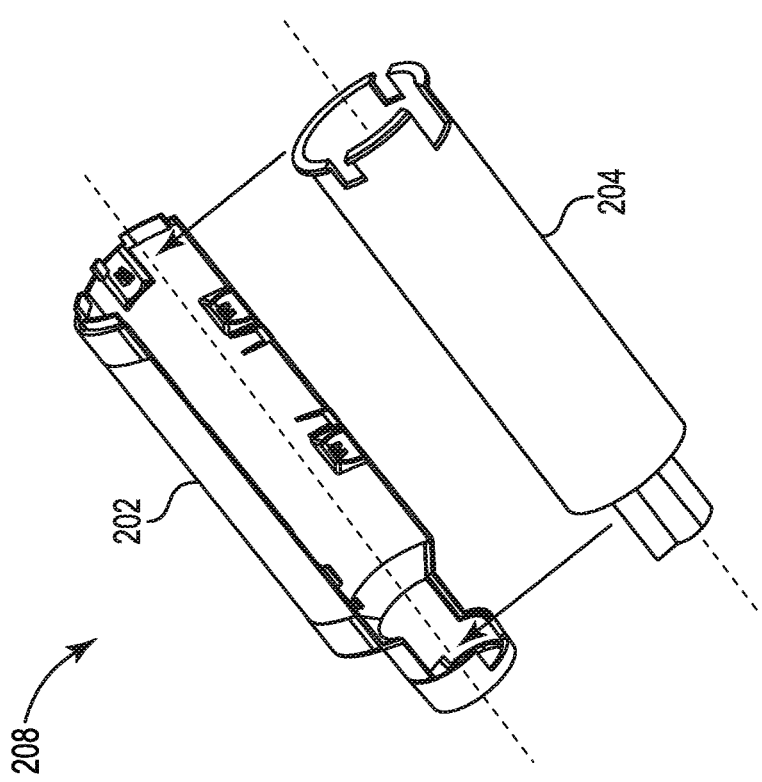
FIG. 2 illustrates a partial exploded view of an example of a print material particles container consistent with the disclosure.

FIG. 2 illustrates a partial exploded view of an example of print material particles container 208 consistent with the disclosure. Print material particles container 208 can include outer syringe body 202 and inner syringe body 204.

Outer syringe body 202 can be analogous to syringe body 101, previously described in connection with FIG. 1. As used herein, the term "outer syringe body" refers to an outer portion of the syringe structure.

Inner syringe body 204 can be analogous to inner portion 103 of syringe body 101, previously described in connection with FIG. 1. As used herein, the term "inner syringe body" refers to an inner portion of the syringe structure.

Outer syringe body 202 and inner syringe body 204 can be coaxially located relative to each other. For example, inner syringe body 204 can be coaxially located in outer syringe body 202.

Outer syringe body 202 and inner syringe body 204 can be fixed relative to each other. For example, outer syringe body 202 and inner syringe body 204 cannot move relative to one another, FIG. 3A illustrates a front cross-sectional view of an example of an apparatus 308 including an outer syringe body 302 consistent with the disclosure. As illustrated in FIG. 3A, apparatus 308 can include outer syringe body 302.

As previously described in connection with FIG. 1, outer syringe body 302 can include a non-circular cross-sectional shape. For example, as illustrated in FIG. 3A, outer syringe body 302 can include a cross-section of a square with rounded corners. However, examples of the disclosure are not so limited. For example, outer syringe body 302 can include a cross-sectional shape that is a rectangle with rounded corners, a triangular cross-sectional shape, or an irregular cross-sectional shape, among other shapes.

As described above, in some examples, the outer syringe body 302 can include an irregular cross-sectional shape. For example, outer syringe body 302 can include an ergonomically shaped cross-section. As used herein, the term "ergonomically shaped" refers to a shape that is designed to minimize physical discomfort for a user. For example, the ergonomically shaped cross-section can be in a shape such that, when a user wraps their hand and/or fingers around the outer syringe body 302, the shape is conformed to the user's hand and/or fingers.

Figure 3B:
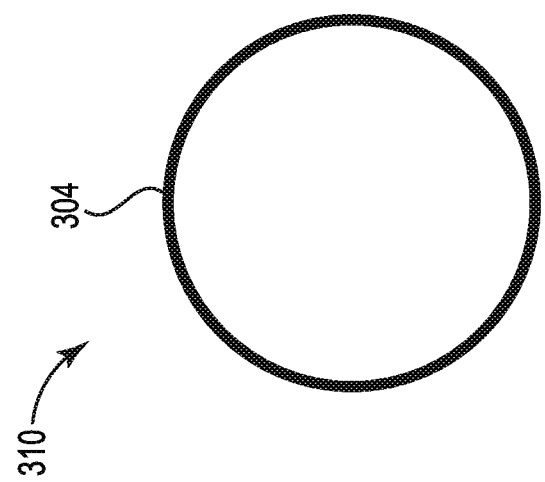
FIG. 3B illustrates a front cross-sectional view of an example of an apparatus including an inner syringe body consistent with the disclosure
Figure 3A:
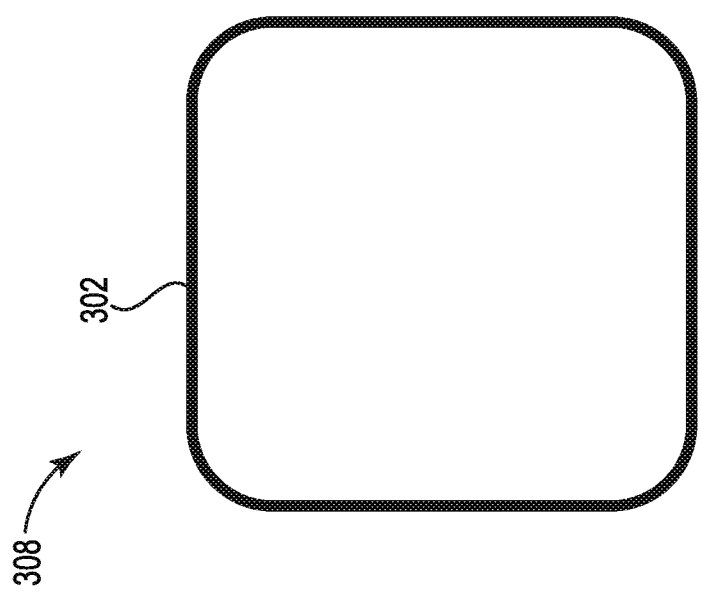
FIG. 3A illustrates a front cross-sectional view of an example of an apparatus including an outer syringe body consistent with the disclosure.

FIG. 3B illustrates a front cross-sectional view of an example of an apparatus 310 including an inner syringe body 304 consistent with the disclosure. As illustrated in FIG. 3A, apparatus 310 can include inner syringe body 304.

As previously described in connection with FIG. 1, inner syringe body 304 can include a circular cross-sectional shape. For example, as illustrated in FIG. 3B, inner syringe body 304 can include a circular cross-section. A circular cross section can help to provide a fluid tight seal between the inner portion of inner syringe body 304 and the plunger.

Figure 4:
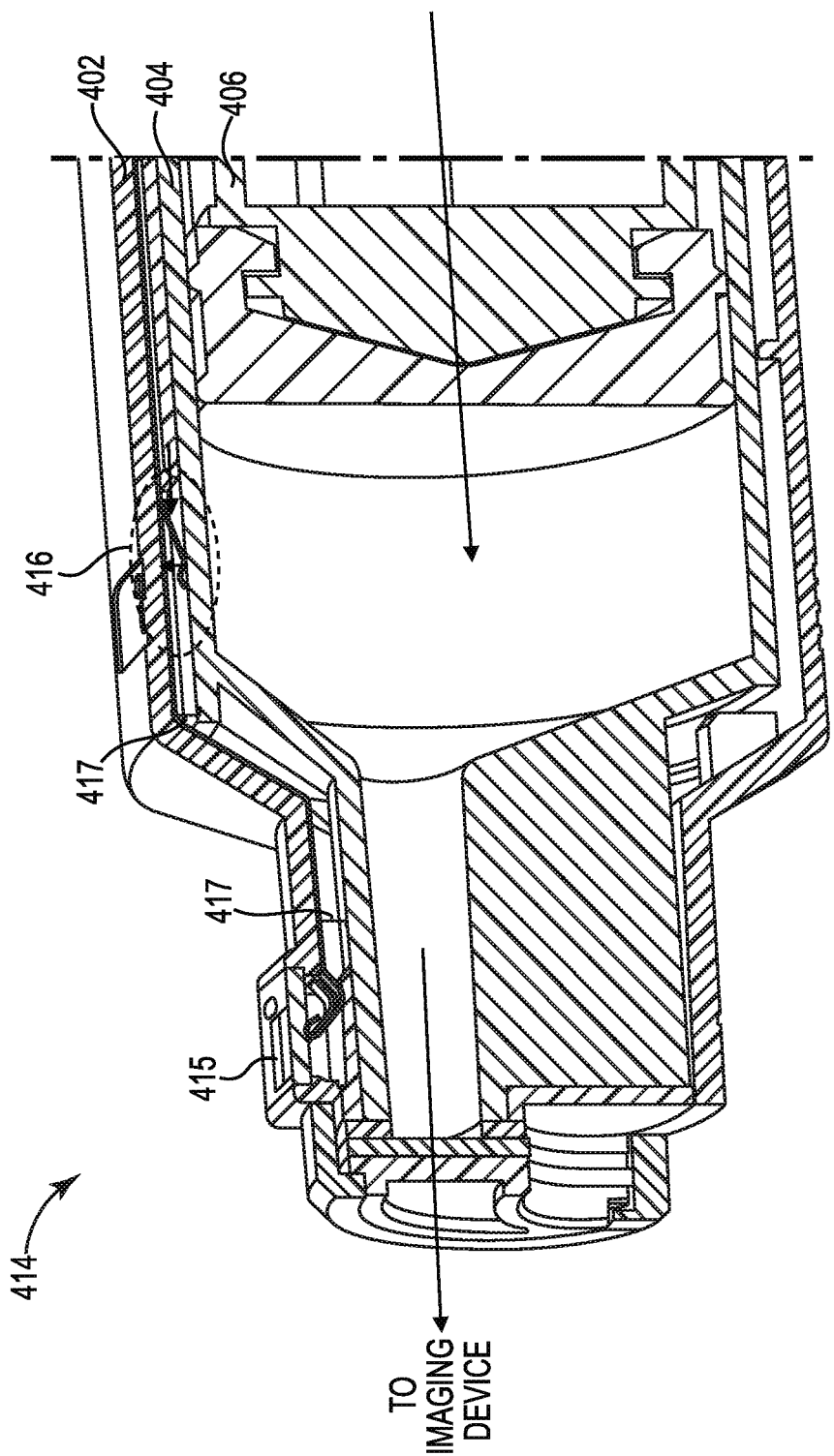
FIG. 4 illustrates a cutaway view of an example of a print material particles container consistent with the disclosure.

FIG. 4 illustrates a cutaway view of an example of a print material particles container 414 consistent with the disclosure. Print material particles container 414 can include outer syringe body 402, inner syringe body 404, and plunger 406. Outer syringe body 402 can include electrical interface 415 and switch 416.

As previously described in connection with FIGS. 1 and 2, inner syringe body 404 can be coaxially located in outer syringe body 402. Plunger 406 can be coaxially located in inner syringe body 404. Outer syringe body 402 and inner syringe body 404 can each include cross-sectional shapes, where the cross-sectional shape of outer syringe body 402 is different than the cross-sectional shape of inner syringe body 404.

Inner syringe body 404 can be located in outer syringe body 402 such that space 417 exists between inner syringe body 404 and outer syringe body 402. As used herein, the term "space" refers to an empty gap between objects. For example, a gap exists between inner syringe body 404 and outer syringe body 402 such that other objects can be located in the space between inner syringe body 404 and outer syringe body 402, as is further described herein.

As illustrated in FIG. 4, space 417 can include switch 416 and electrical interface 415. Space 417 can be continuous between outer syringe body 402 and inner syringe body 404.

Switch 416 can be located between outer syringe body 402 and inner syringe body 404. As used herein, the term "switch" refers to an electrical device that enables or disables a flow of electrical current in an electrical circuit. For example, a switch can enable a flow of electrical current, allowing electrical current to flow in the electrical circuit. A switch that has enabled the flow of electrical current is a closed switch. As another example, a switch can disable a flow of electrical current, preventing electrical current from flowing in the electrical circuit. A switch that has disabled the flow of electrical current is an open switch.

Switch 416 can be a normally open switch. As used herein, the term "normally open switch" refers to a switch that is in an open state unless the switch is acted upon. For example, switch 416 can be in an open state (e.g., preventing electrical current from flowing in the electrical circuit connected to switch 416) until switch 416 is acted upon by another object, as is further described herein.

Inner syringe body 404 can include print material particles. As the imaging device performs print jobs, print material particles in the imaging device can deplete. Therefore, during a fill and/or refill operation, print material particles may be supplied to the imaging device so that the imaging device can continue to perform print jobs. For example, print material particles container 414 can be connected to the imaging device such that, during a fill and/or refill operation, plunger 406 can be moved from the first position to the second position to expel print material particles from inner syringe body 404 to the imaging device. The print material particles can fill/refill the imaging device such that the imaging device can continue to perform print jobs.

As plunger 406 is moved from the first position to the second position, switch 416 can be closed. For example, as a result of the movement of plunger 406, switch 416 can be closed when plunger 406 reaches the second position. As a result of switch 416 being in a closed state, electrical current can flow in the electrical circuit connected to switch 416. In other words, switch 416 can be closed when plunger 406 is moved to the second position and print material particles is expelled from inner syringe body 404 to the imaging device.

As described above, switch 416 can detect when plunger 406 has reached the second position as a result of switch 416 being closed. In response to the switch being closed, electrical current can flow in the electrical circuit connected to switch 416. Although not illustrated in FIG. 4 for clarity and so as not to obscure examples of the disclosure, switch 416 and electrical interface 415 can be connected via the electrical circuit therebetween. As used herein, the term "electrical interface" refers to a device that enables communication between two electrical devices. For example, electrical interface 415 can enable communication between print material particles container 414 and the imaging device.

In response to switch 416 being closed, a signal can be transmitted to the imaging device by electrical interface 415. As illustrated in FIG. 4, electrical interface 415 can be an electrically erasable programmable read-only memory (EEPROM). However, examples of the disclosure are not so limited. For example, electrical interface 415 can be a wireless transmitter, among other types of electrical interfaces.

Electrical interface 415 can transmit a signal to the imaging device in response to the circuit being completed by switch 416 being closed. For example, print material particles container 414 can be connected to the imaging device during a fill and/or refill operation. When the plunger is moved from the first position to the second position, print material particles can be supplied to the imaging device. When the plunger is at the second position, the print material particles have been expelled from the inner syringe body 404, and switch 416 can be closed as a result of the plunger being at the second position.

When the print material particles have been expelled from the inner syringe body 404, the signal can be transmitted to the imaging device in response to the circuit being completed when switch 416 is closed. The signal can be transmitted to the imaging device so that the imaging device can determine the fill and/or refill operation is complete so that the imaging device can continue to perform print jobs.

Figure 5:
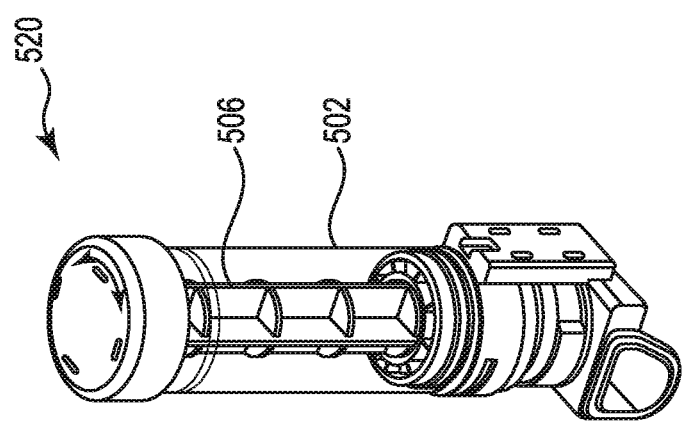
FIG. 5 illustrates an example of a print material particles container in a first position and a second position consistent with the disclosure.
Figure 5:
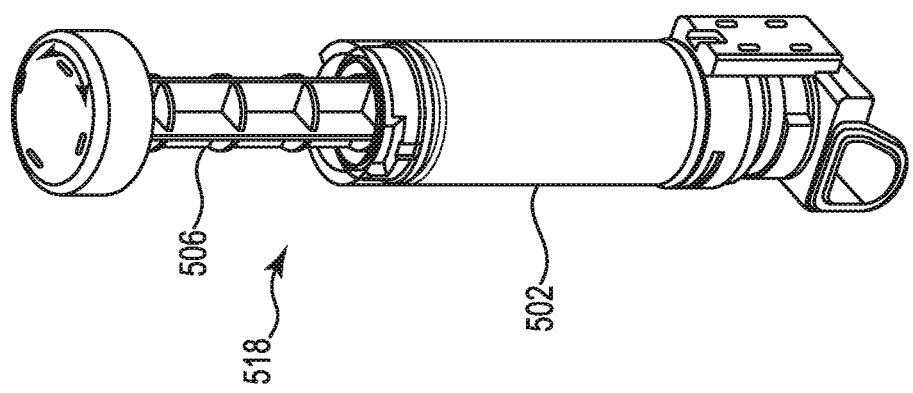

FIG. 5 illustrates an example of a print material particles container in a first position 518 and a second position 520 consistent with the disclosure. As previously described in connection with FIGS. 1-4, the print material particles container can include an outer syringe body 502 and a plunger 506.

The print material particles container can be in a first position 518. For example, in first position 518, plunger 506 of print material particles container 518 is in a first position and is not depressed into the inner syringe body (e.g., not illustrated in FIG. 5). Accordingly, the inner syringe body can include print material particles to supply to an imaging device.

Although not illustrated in FIG. 5 for clarity and so as not to obscure examples of the disclosure, the print material particles container can be connected to an imaging device. For example, the print material particles container can be connected to an imaging device so that print material particles may be supplied to the imaging device so that the imaging device can perform print jobs. Plunger 506 can be depressed to expel print material particles from the print material particles container to the imaging device, as is further described herein.

Plunger 506 can be depressed as illustrated in FIG. 5. For example, plunger 506 can be depressed from first position 518 to second position 520. As a result of the plunger 506 being depressed to second position 520, print material particles can be expelled from the print material particles container. For example, the print material particles container be connected to the imaging device such that, during a fill and/or refill operation, plunger 506 can be moved from the first position to the second position to expel print material particles from the inner syringe body to the imaging device. The print material particles can fill/refill the imaging device such that the imaging device can continue to perform print jobs.

Figure 6:
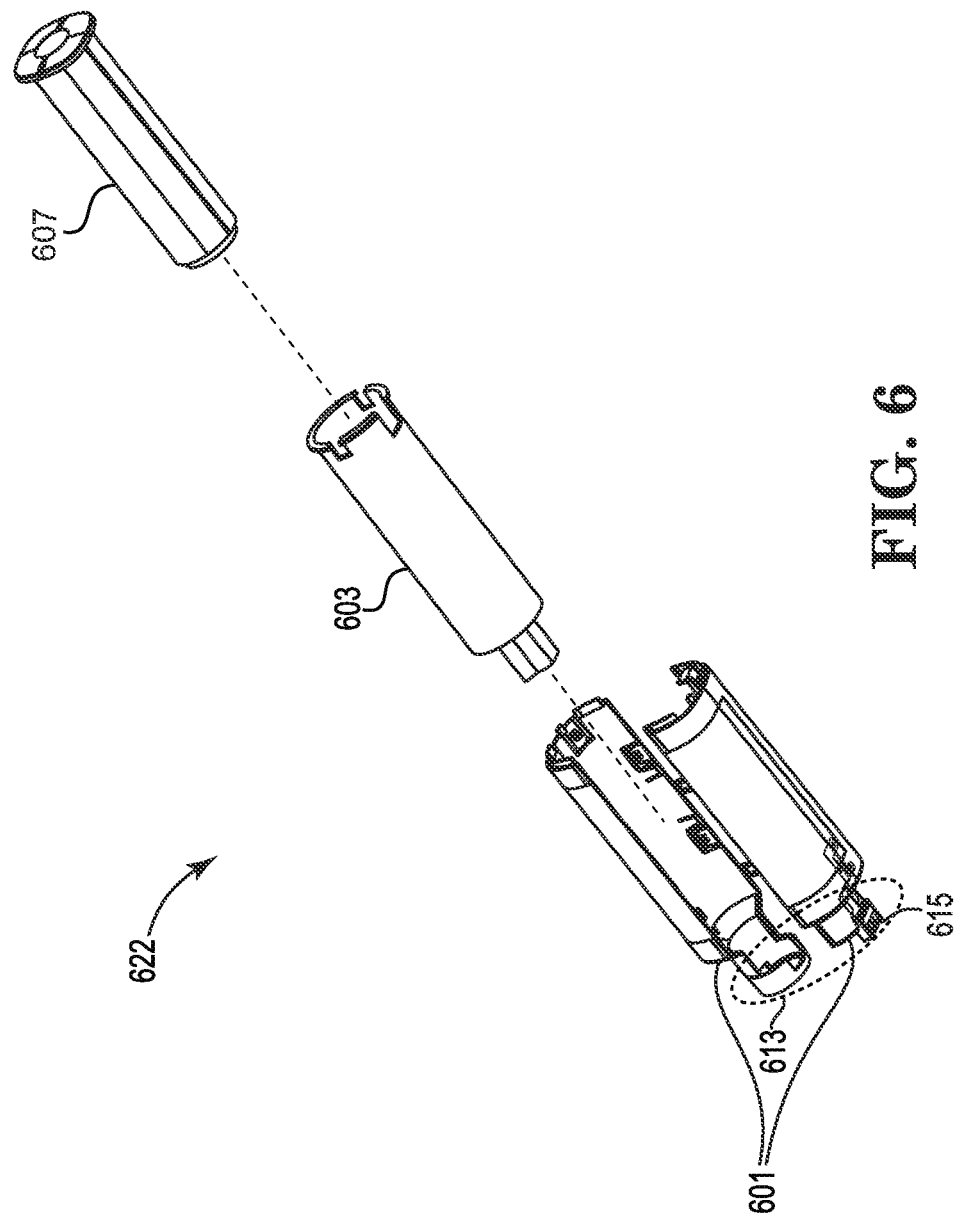
FIG. 6 illustrates an exploded view of an example of a print material particles container consistent with the disclosure.

FIG. 6 illustrates an exploded view of an example of a print material particles container 622 consistent with the disclosure. Print material particles container 622 can include syringe body 601, print material particles reservoir 603, and volume adapting structure 607. Syringe body 601 can include electrical interface 615.

Syringe body 601 can be analogous to outer syringe body 202 and outer body 830, as described in connection with FIGS. 2 and 8, respectively. Print material particles reservoir 603 can be analogous to inner syringe body 204, 304, 404 and print material particles reservoir 832, as described in connection with FIGS. 2-4 and FIG. 8, respectively.

As illustrated in FIG. 6, print material particles container 622 can include volume adapting structure 607. Although not illustrated in FIG. 6 for clarity and so as not to obscure examples of the disclosure, volume adapting structure 607 can be located in print material particles reservoir 603. For example, volume adapting structure 607 can be coaxially located in print material particles reservoir 603 to allow volume adapting structure 607 to take in print material particles to and/or expel print material particles from print material particles reservoir 603, Volume adapting structure 607 can be analogous to plunger 106, 406, 506 and volume adapting structure 834, as described in connection with FIGS. 1, 4, 5, 6, and 8, respectively. That is, volume adapting structure 607 can adapt a volume of print material particles reservoir 603 to move print material particles out of print material particles reservoir 603 through the output (e.g., output 838, described in connection with FIG. 8).

The print material particles container 622 can include an interface 613. As used herein, the term "interface" refers to a location of print material particles container 622 at which print material particles container 622 interacts with the imaging device. For example, interface 613 can interface with a cylindrical cross-sectional shape of an input structure of a receiving reservoir of the imaging device to provide print material particles to the imaging device.

Interface 613 can include an output. The output can be located at a distal surface of syringe body 601. As used herein, the term "distal" refers to an object situated away from a center of a body. For example, the print material particles container 622 can include an output located distally from the center of syringe body 601 (e.g., at an end point of syringe body 601). Print material particles can be moved through the output from print material particles reservoir 603 by volume adapting structure 607 to the imaging device, as is further described in connection with FIGS. 7 and 8.

Print material particles reservoir 603 can be coaxially located in syringe body 601, Print material particles reservoir 603 and syringe body 601 can be fixed relative to each other.

As illustrated in FIG. 6, syringe body 601 can include electrical interface 615. Electrical interface 615 can be located at a side surface of syringe body 601. Electrical interface 615 can transmit a signal in response to volume adapting structure 607 moving from the first position to the second position, as is further described in connection with FIG. 7.

Electrical interface 615 can be located within syringe body 601. For example, electrical interface 615 can be located in syringe body 601 such that a circuit can connect electrical interface 615 to a switch located between syringe body 601 and print material particles reservoir 603, and electrical interface 615 can interact with an external electrical interface (e.g., such as an electrical interface of an imaging device, as is further described herein). However, examples of the disclosure are not so limited. In some examples, electrical interface 615 can be a wireless transmitter located between syringe body 601 and print material particles reservoir 603, as is further described in connection with FIG. 7.

Although not shown in FIG. 6 for clarity and so as not to obscure examples of the disclosure, syringe body 601 can include a switch. The switch can be normally open. The switch can be closed in response to volume adapting structure 607 moving from the first position to the second position, as is further described in connection with FIG. 7.

As previously described, print material particles reservoir 603 can include print material particles. As the imaging device performs print jobs, print material particles in the imaging device can deplete. Therefore, during a fill and/or refill operation, print material particles may be supplied to the imaging device from print material particles reservoir 603 so that the imaging device can continue to perform print jobs. For example, print material particles container 622 can be connected to the imaging device such that, during a fill and/or refill operation, volume adapting structure 607 can be moved from the first position to the second position to expel print material particles from print material particles reservoir 603 to the imaging device. The print material particles can fill/refill the imaging device such that the imaging device can continue to perform print jobs.

Volume adapting structure 607 can move from the first position to the second position relative to inner portion 603 of syringe body 601. For example, inner portion 603 and syringe body 601 can be fixed relative to each other such that volume adapting structure 607 can move relative to inner portion 603 and syringe body 601.

In response to volume adapting structure 607 moving from the first position to the second position to expel print material particles from print material particles reservoir 603 to the imaging device, a signal can be transmitted by electrical interface 615. The signal can be transmitted by electrical interface 615 to the imaging device to indicate the print material particles are supplied to the imaging device from print material particles reservoir 603. The signal can be transmitted by electrical interface 615 in various ways, as is further described in connection with FIG. 7.

Figure 7:
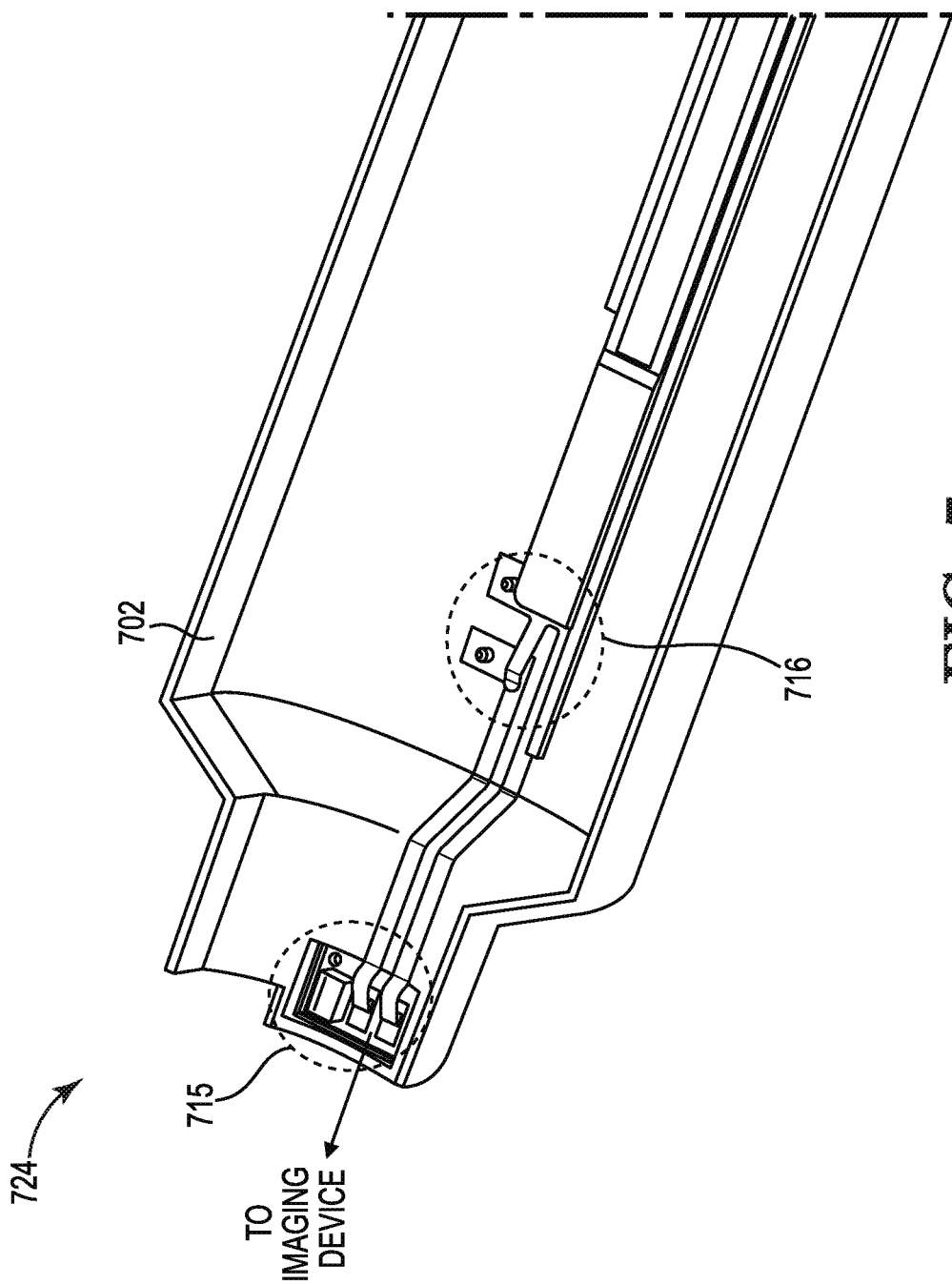
FIG. 7 illustrates an example of a portion of an apparatus including an outer syringe body consistent with the disclosure.

FIG. 7 illustrates an example of a portion of an apparatus 724 including a syringe body 701 consistent with the disclosure. Syringe body 701 can include electrical interface 715 and switch 716.

As described in connection with FIG. 6, syringe body 701 can include electrical interface 715 and switch 716. An electrical circuit can connect switch 716 and electrical interface 715.

Although not illustrated in FIG. 7 for clarity and so as not to obscure examples of the disclosure, a print material particles reservoir can be coaxially located in syringe body 701. The print material particles reservoir can include print material particles that can be provided to an imaging device.

Additionally, although not illustrated in FIG. 7 for clarity and so as not to obscure examples of the disclosure, a volume adapting structure (e.g., a plunger) can be coaxially located in the print material particles reservoir. As previously described, the volume adapting structure can be moved from a first position to a second position to cause print material particles included in the print material particles reservoir to be supplied to the imaging device.

In response to the volume adapting structure moving from the first position to the second position, switch 716 can be closed. For example, as a result of the volume adapting structure moving from the first position to the second position, switch 716 can be in a closed state. As a result of switch 716 being in a closed state, the circuit connecting switch 716 and electrical interface 715 can be completed. The completed circuit can allow electrical current to flow in the electrical circuit connecting switch 716 and electrical interface 715. In response to switch 716 being closed and electrical current flowing in the electrical circuit connecting switch 716 and electrical interface 715, a signal can be transmitted by electrical interface 715 to the imaging device.

In some examples, electrical interface 715 can be connected to a corresponding electrical interface of the imaging device. For example, syringe body 701 can be connected to the imaging device such that, during a fill and/or refill operation, the volume adapting structure can be moved from the first position to the second position to expel print material particles from the print material particles reservoir to the imaging device. As syringe body 701 is connected to the imaging device, electrical interface 715 can be connected to a corresponding electrical interface of the imaging device. The signal generated in response to switch 716 being closed can be transmitted by electrical interface 715 to the imaging device via the corresponding electrical interface of the imaging device.

In some examples, electrical interface 715 can be a wireless transmitter. As used herein, the term "wireless transmitter" refers to an electronic device that produces radio waves. For example, electrical interface 715 can produce radio waves that can be transmitted to a wireless receiver included in the imaging device. In response to the volume adapting structure being moved from the first position to the second position to expel print material particles from the inner syringe body to the imaging device, the signal can be wirelessly transmitted by electrical interface 715 to the imaging device. Electrical interface 715 can be a wireless transmitter such as a Bluetooth, Bluetooth low energy, and/or a radio frequency identification (RFID) transmitter, among other types of wireless transmitters.

In some examples, electrical interface 715 can be a wireless field modification circuit. For example, the imaging device can include a near field communication (NFC) reader that emits a radio frequency (RF) field, and electrical interface 715 can be an NFC tag that responds to the NFC reader RF field. As used herein, the term "NFC" refers to a communication protocol to enable two electronic devices to establish wireless communication with each other when they are within a particular distance from one another. For example, in response to the volume adapting structure being moved from the first position to the second position to expel print material particles from the inner syringe body to the imaging device, a switch can be closed allowing electrical interface 715 to respond to the NFC reader RF field in a different manner than when the switch is open, thereby wirelessly transmitting the state of the plunger 106 to the imaging device.

As described above, when the print material particles have been dispensed from the inner syringe body, the signal can be transmitted to the imaging device in response to switch 716 being closed. The signal can be transmitted to the imaging device to indicate the print material particles have been dispensed from the print material particles reservoir so that the imaging device can determine the fill and/or refill operation is complete so that the imaging device can continue to perform print jobs.

Figure 8:
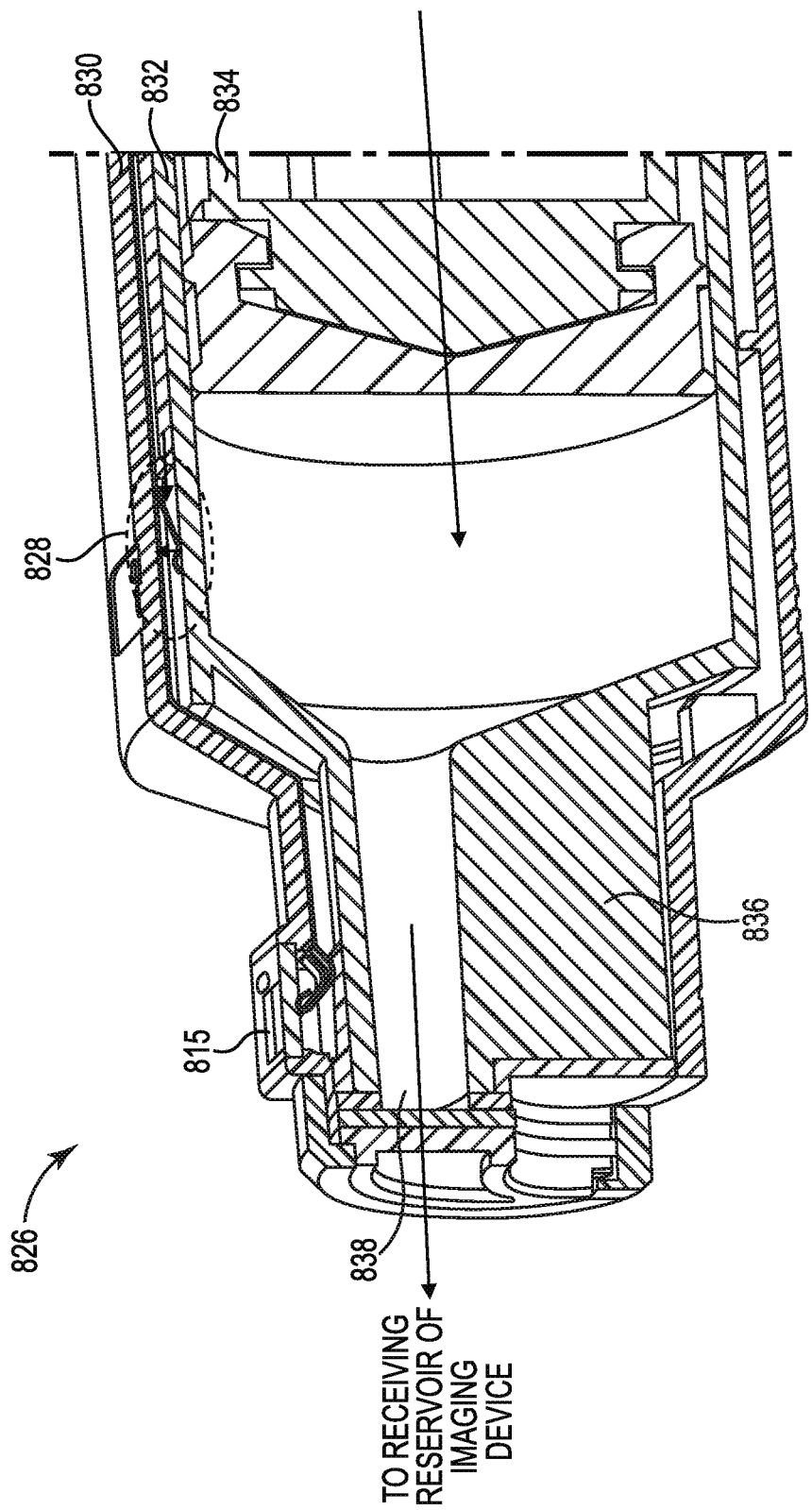
FIG. 8 illustrates a cutaway view of an example of a print material particles container consistent with the disclosure.

FIG. 8 illustrates a cutaway view of an example of a print material particles container 826 consistent with the disclosure. Print material particles container 826 can include outer body 830, print material particles reservoir 832, volume adapting structure 834, output structure 836, and output 838 of output structure 836.

Print material particles container 826 can include an outer body 830. As used herein, the term "outer body" refers to a structure of a syringe. The outer body 830 can be an outer structure of a syringe. Outer body 830 can be analogous to syringe body 101 and outer syringe body 202, previously described in connection with FIGS. 1 and 2, respectively.

Outer body 830 can include a cross-sectional shape that is non-circular. For example, outer body 830 can include a cross-sectional shape that is a square with rounded corners, among other non-circular cross-sectional shapes.

Outer body 830 can include one plane of symmetry. As used herein, the term "plane of symmetry" refers to a two-dimensional (2D) surface that bisects a solid into two mirrored halves. For example, outer body 830 can be bisected into two-mirrored halves by one plane of symmetry.

Print material particles container 826 can include a print material particles reservoir 832. As used herein, the term "print material particles reservoir" refers to a container, tank, and/or similar vessel to store a supply of print material particles. Print material particles reservoir 832 can be a portion of a syringe. Print material particles container 826 can be analogous to inner portion 103 and inner syringe body 204, previously described in connection with FIGS. 1 and 2, respectively. Print material particles reservoir 832 can include print material particles.

Print material particles reservoir 832 and volume adapting structure 834 can include cross-sectional shapes that are a same shape. For example, print material particles reservoir 832 and volume adapting structure 834 can include circular cross-sectional shapes such that volume adapting structure 834 can move along an inner surface of print material particles reservoir 832.

Outer body 830 can include a cross-sectional shape that is different than the cross-sectional shapes of print material particles reservoir 832 and volume adapting structure 834. For example, print material particles reservoir 832 and volume adapting structure 834 can have circular cross-sectional shapes, and outer body 830 can include a non-circular cross-sectional shape (e.g., a square with rounded corners).

Print material particles container 826 can include output structure 836. As used herein, the term "output structure" refers to a structure including an opening through which material can be moved. For example, output structure 836 can include opening 838. Print material particles can be moved through opening 838 of output structure 836 in response to volume adapting structure 834 decreasing a volume of print material particles reservoir 832 based on movement of volume adapting structure 834 in print material particles reservoir 832, as is further described herein. Print material particles can be moved through opening 838 to a receiving reservoir of an imaging device.

Output structure 836 can be located at an end of outer body 830. The output structure can include a shape to interface with a cylindrical cross-sectional shape of an input structure of the receiving reservoir. For example, output structure 836 can be of a cylindrical shape such that output structure 836 can interface with a cylindrical cross-sectional shape of the input structure of the receiving reservoir of the imaging device.

Print material particles container 826 can include a volume adapting structure 834. As used herein, the term "volume adapting structure" refers to a piston to take in and/or expel print material particles through output 838 at the end of print material particles reservoir 832. Volume adapting structure 834 can be analogous to plunger 106, 406, 506, and volume adapting structure 607, previously described in connection with FIGS. 1 and 4-6, respectively.

Volume adapting structure 834 can adapt a volume of print material particles reservoir 832. For example, volume adapting structure 834 can reduce a volume of print material particles reservoir 832 by moving from a first position to a second position. Volume adapting structure 834 can move with respect to print material particles reservoir 832 and outer body 830 to move print material particles towards and through output 838 to the imaging device.

Print material particles container 826 can include switch circuitry 828. As used herein, the term "switch circuitry" refers to components of an electrical device to enable or disable a flow of electrical current in an electrical circuit. For example, switch circuitry 828 can enable of disable a flow of electrical current in a circuit that connects switch circuitry 828 with electrical interface 815, as is further described herein. Switch circuitry 828 can detect at least one position of volume adapting structure 832. For example, switch circuitry 828 can detect volume adapting structure 832 moving from a first position to a second position (e.g., can detect volume adapting structure 832 reaching the second position) to detect the print material particles being moved from print material particles reservoir 832 to the receiving reservoir of the imaging device via output 838 of output structure 836. Switch circuitry 828 can include switch 416, previously described in connection with FIG. 4.

Outer body 830 can include electrical interface 815. Electrical interface 815 can be located on a side of outer body 830, as is illustrated in FIG. 8. Electrical interface 815 can enable communication between two electrical devices. For example, electrical interface 815 can enable communication between print material particles container 826 and the imaging device. Electrical interface 815 can be connected to switch circuitry 828.

For example, electrical interface 815 can transmit a signal to the imaging device in response to the switch included in switching circuitry 828 being closed. For example, print material particles container 826 can be connected to the imaging device during a fill and/or refill operation. When the volume adapting structure 834 is moved from the first position to the second position, print material particles can be supplied to the imaging device. When the volume adapting structure 834 is at the second position, the print material particles have been expelled from the print material particles reservoir 832 and switching circuitry 828 can allow current to flow between electrical interface 815 and switching circuitry 828.

When the print material particles have been expelled from the print material particles reservoir 832, the signal can be transmitted to the imaging device in response to the circuit being completed when the switch included in switching circuitry 828 is closed. The signal can be transmitted to the imaging device so that the imaging device can determine the fill and/or refill operation is complete so that the imaging device can continue to perform print jobs.

Syringe bodies according to the disclosure can allow for determination of completion of a fill/refill operation of an imaging device. When the determination that the fill/refill operation is complete, the imaging device can perform print jobs.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 106 may refer to element 106 in FIG. 1 and an analogous element may be identified by reference numeral 206 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A print material particles container, comprising:
   a syringe body including an electrical interface at a side surface of the syringe body;
   an interface at an end of the syringe body including an output at a distal surface of the syringe body;
   a print material particles reservoir located in the syringe body; and
   a volume adapting structure to adapt a volume of the print material particles reservoir to move print material particles out of the print material particles reservoir through the output;
   wherein, in response to the volume adapting structure moving from a first position to a second position, a signal is transmitted by the electrical interface to indicate the print material particles have been dispensed from the print material particles reservoir,
   wherein the print material particles container further includes a switch located between the syringe body and the print material particles reservoir, and
   wherein in response to the volume adapting structure moving from the first position to the second position:
   the switch changes from a first state to a second state; and
   the signal is transmitted in response to the switch changing from the first state to the second state.

2. The apparatus of claim 1, wherein, in response to the volume adapting structure moving from the first position to the second position:
   the switch is closed; and
   the signal is transmitted in response to the switch being closed.

3. The apparatus of claim 1, wherein the electrical interface is located within the syringe body.

4. The apparatus of claim 1, wherein, in response to the volume adapting structure moving from the first position to the second position, the signal is communicated wirelessly by the electrical interface.

5. A print material particles container, comprising:
   a syringe body including a switch and an electrical interface;

a print material particles reservoir located in the syringe body, wherein the print material particles reservoir includes print material particles;

an interface at an end of the syringe body including an output at a distal surface of the syringe body; and a volume adapting structure to adapt a volume of the print material particles reservoir;

wherein, in response to the volume adapting structure moving from a first position to a second position to change the switch:

the print material particles are moved out of the print material particles reservoir, through the output, and to an imaging device; and a signal is transmitted by the electrical interface to indicate the print material particles have been dispensed from the print material particles reservoir, and wherein the switch is located between the syringe body and the print material particles reservoir.

6. The print material particles container of claim 5, wherein the signal is transmitted by the electrical interface to the imaging device.

7. The print material particles container of claim 6, wherein the signal is wirelessly transmitted by the electrical interface to the imaging device.

8. The print material particles container of claim 6, wherein:

the electrical interface of the print material particles container is connected to a corresponding electrical interface of the imaging device; and the signal is transmitted by the electrical interface to the imaging device via the corresponding electrical interface of the imaging device.

9. The print material particles container of claim 5, wherein:

the syringe body is an outer syringe body and the print material particles reservoir is an inner body coaxially located in the outer syringe body; and the volume adapting structure moves from the first position to the second position relative to the outer syringe body and the inner syringe body.

10. The print material particles container of claim 5, wherein in response to the volume adapting structure moving from the first position to the second position, the signal is transmitted by the electrical interface to indicate the print material particles has been dispensed from the print material particles reservoir.

11. A system, comprising:

a syringe body including a switch and an electrical interface at a side surface of the syringe body;

a print material particles reservoir located in the syringe body;

an interface at an end of the syringe body including an output at a distal surface of the syringe body; and a plunger coaxially located in the print material particles reservoir;

wherein, in response to the plunger moving from a first position to a second position:

the switch is changed;

print material particles located in the print material particles reservoir are supplied from the print material particles reservoir to an imaging device; and a signal is transmitted by the electrical interface to the imaging device in response to the switch being changed to indicate the print material particles having been supplied to the imaging device from the print material particles reservoir, and wherein the switch is located between the syringe body and the print material particles reservoir.

12. The system of claim 11, wherein, in response to the switch being changed, a circuit is completed.

13. The system of claim 12, wherein, in response to the circuit being completed, the signal is transmitted by the electrical interface to the imaging device.

14. The system of claim 11, wherein the print material particles container is connected to the imaging device via the interface such that the print material particles are supplied from the print material particles reservoir to the imaging device when the plunger is moved from the first position to the second position.

* * * * *